UNITED STATES PATENT OFFICE.

FREDERIC T. JAMES, OF NEW YORK, N. Y.

DETERGENT COMPOSITION.

SPECIFICATION forming part of Letters Patent No. 556,847, dated March 24, 1896.

Application filed December 27, 1895. Serial No. 573,556. (No specimens.)

*To all whom it may concern:*

Be it known that I, FREDERIC T. JAMES, a citizen of the United States, and a resident of New York, in the county of New York and State of New York, have invented a certain new and useful Composition of Matter, of which the following is a specification, such as will enable those skilled in the art to which it appertains to make and use the same.

The object of this invention is to provide a cream or paste for use in shaving and for toilet and other purposes, and the composition which forms a basis thereof consists of the following ingredients, which are combined in the following specified proportions, viz: pure white beeswax, six parts; stearic acid, four parts; spermaceti, two parts; oil of sweet almonds, six parts; oil of lavender, one and one-half parts; oil of rose-geranium, one-half part; carbonate of soda, one part; water, seventy-nine parts. The process of combining these ingredients is substantially as follows:

The beeswax, spermaceti, stearic acid, together with the oil of sweet almonds, are melted and mingled over boiling water and in any suitable vessel, and apart from this the carbonate of soda is dissolved in the required or necessary amount of water, and the solution thus formed is heated to the boiling-point and the oil of rose-geranium and the oil of lavender are added thereto, and the solution thus formed is mingled and thoroughly mixed with the solution formed by beeswax, stearic acid, spermaceti, and oil of sweet almonds. A fine white creamy emulsion is thus formed, which should be constantly stirred until the product is entirely cold, and when cold it will have the consistency of a paste or thick cream, and in shaving it may be applied to the face by the fingers or by a brush, and for toilet, bathing, and other purposes it may be used in the manner of an ordinary soap.

If the product produced by the foregoing process is too thin, the amount of water may be decreased by five parts and five additional parts of the oil of sweet almonds may be added, and it is evident that other changes may be made in the proportions without departing from the spirit of my invention or sacrificing its advantages.

My improved composition will be found to be perfectly adapted for the purpose for which it is intended, and in practice is preferably packed in bottles or cans, and it will also be found to be a healthful antiseptic preparation and one well adapted to keep the skin in a healthy and smooth condition.

Having fully described my invention, I claim as new and desire to secure by Letters Patent—

1. The herein-described composition of matter, composed of the following ingredients, beeswax, stearic acid, spermaceti, oil of sweet almonds, oil of lavender, oil of rose-geranium, carbonate of soda, and water, said ingredients being combined, substantially as described.

2. The herein-described composition of matter, which comprises, pure white beeswax, six parts, stearic acid, four parts, spermaceti, two parts, oil of sweet almonds, six parts, oil of lavender, one and one-half parts, oil of rose-geranium, one-half part, carbonate of soda, one part, and water, seventy-nine parts, said ingredients being combined, substantially as described.

In testimony that I claim the foregoing as my invention I have signed my name, in presence of the subscribing witnesses, this 23d day of December, 1895.

FREDERIC T. JAMES.

Witnesses:
C. GERST,
L. M. MULLER.